United States Patent [19]

Farnsworth et al.

[11] Patent Number: 5,443,092
[45] Date of Patent: Aug. 22, 1995

[54] FLUID FLOW VALVE DEVICE AND ASSEMBLIES CONTAINING IT

[75] Inventors: John T. Farnsworth; Roger D. Johnson, both of St. Joseph, Mo.

[73] Assignee: Nestec S.A., Vevey, Switzerland

[21] Appl. No.: 188,950

[22] Filed: Jan. 28, 1994

[51] Int. Cl.6 .............................................. F16K 15/02
[52] U.S. Cl. ..................... 137/542; 137/541;
                              137/538; 425/97; 425/382 R
[58] Field of Search ............... 137/538, 541, 542;
                              425/382 R, 225, 227, 97

[56] References Cited

U.S. PATENT DOCUMENTS

| | | | |
|---|---|---|---|
| 574,577 | 1/1897 | Royle | 425/97 |
| 630,080 | 8/1899 | Voorhees et al. | 425/97 |
| 1,462,519 | 7/1923 | Rothe | 137/541 |
| 1,906,744 | 5/1933 | Frandsen | 425/97 |
| 1,941,727 | 1/1934 | Wilcox | 137/538 X |
| 2,021,337 | 11/1935 | Trefz | 137/538 X |
| 2,206,356 | 7/1940 | Hutchings | 137/538 X |
| 2,928,417 | 3/1960 | Buckner et al. | 137/541 X |
| 2,958,099 | 11/1960 | Chisholm et al. | 425/382 R |
| 3,125,119 | 3/1964 | Richgels | 137/538 |
| 4,375,864 | 3/1983 | Savage | 222/81 |
| 4,634,027 | 1/1987 | Kanarvogel | 137/541 X |
| 4,660,595 | 4/1987 | Küster | 137/538 X |

FOREIGN PATENT DOCUMENTS

| | | | |
|---|---|---|---|
| 574449 | 4/1959 | Canada | 137/538 |
| 527617 | 4/1954 | France | 137/538 |
| 1069964 | 11/1959 | Germany | 137/538 |

*Primary Examiner*—John Rivell
*Attorney, Agent, or Firm*—Vogt & O'Donnell

[57] ABSTRACT

A valve device for restricting fluid flow has a hollowed piston member having a closed piston end wall and an open piston seat end. The piston end wall is integral with a second piston wall which extends to the piston seat open end which, in turn, opens into a chamber defined by the piston end wall and second wall. The piston second wall is positioned in slidable contact with a housing interior wall surface and has at least one aperture positioned therethrough for a fluid to flow in or out of the piston from the chamber so that upon the piston being reciprocated in the housing, when the piston seat end is seated in a seat integral with the housing, the at least one second wall aperture is confined by the housing interior wall surface to close the valve to fluid flow and so that when the piston is at a position displaced away from the seat, the at least one aperture is unconfined by the housing so that the valve is open to flow of fluid.

12 Claims, 3 Drawing Sheets

FLUID FLOW VALVE DEVICE AND ASSEMBLIES CONTAINING IT

BACKGROUND OF THE INVENTION

The present invention relates to valves for restricting fluid flow and, in particular, to valves which restrict a fluid flow to flow in a conduit in a single direction, such as check valves.

Varieties of valve means are known and have been suggested for restricting fluid flow in a conduit or from one conduit, in which the valve means is integrated, into another conduit or chamber (hereinafter solely "conduit"). Valves which restrict flow in a single direction are known commonly as check valves, such valves being positioned in a conduit to provide for sealing off and opening the conduit to fluid flow. In general, check valves are categorized by their structure, thusly being known as, for example, gate valves, ball valves and spring-loaded valves. Such valves may be employed usefully, for example, in systems for filling and emptying fluids, an example being illustrated in U.S. Pat. No. 4,375,864, which employs a gate valve, and it is known that Wenget extruder apparati include a ball valve for injecting steam into a barrel of an extruder for heating a substance mix and for load control. Spring-loaded valves may be employed usefully in systems wherein a substance, which is not in a state which interferes spring operation, is introduced from a conduit into a reaction vessel.

Generally common to the check valve assemblies noted above is that if or when such valves are integrated into a system to supply fluid from a first conduit to a second conduit in which a fluid substance different from that restricted by the valve flows, the valve seat and the seal are exposed to the different fluid substance when it flows through the second conduit. One consideration which arises, therefore, in a two-fluid two-conduit system is the potential of seal failure, which can result at least in contamination of the valve, if not, the flow passage of the first conduit, itself, with respect to which the valve is integrated.

Additionally, although check valve assemblies integrated in a first conduit of a two-conduit two-fluid system generally function acceptably when the substance flow in the second conduit is intermittent and alternates with the flow restricted by and introduced into the second conduit by the valve, the potential for problems increases in the case when a fluid from the first conduit is introduced via the valve into the second conduit while a different substance is flowing in the second conduit. In such cases, when the valve is open for fluid flow, the substance flowing in the second conduit may be afforded access to the seat and the seal, which can result in fouling the seat and the seal which, in turn, inhibits effective seating and hence, sealing upon closing the valve to fluid flow, and this can be particularly problematical if the substance which flows in the second conduit is a viscous and/or tacky substance.

SUMMARY OF THE INVENTION

To address problems noted above, the present invention provides a valve device which is particularly useful for introducing a flow of a substance, be it a liquid, gas, or other fluidized substance, hereinafter solely "fluid", from a first conduit into a second conduit wherein the valve, which is integrated with the first conduit, has a piston seat which is segregated from the second conduit and any substance flowing therein, and a seal, if employed, is segregated likewise.

Thus, by reason of the construction of the device, the valve of the present invention addresses problems associated with seal failure of valve designs noted above. Moreover, since, as compared with known check valves, the valve of the present invention is configured so that a valve seat does not itself form a barrier which participates in restricting fluid flow, the valve is particularly useful in a two-conduit two-fluid system for introducing a fluid from a first conduit into a second conduit which accommodates a fluid flow of a substance different from that accommodated by the first conduit. In such systems, the valve is advantageous since it is constructed to effect, when closing the valve to flow, a wiping action between a piston and a housing to reduce a potential of, as compared with known check valves, fouling of the valve by a substance contained in the second conduit.

Accordingly, the present invention provides a valve device for restricting a fluid flow characterized in that it has a hollowed piston member which has an open piston seat end disposed from a closed piston end wall, the end wall being integral with a second piston wall, which extends piston end to piston end and about a piston chamber into which the second end opens and which has at least one aperture therethrough for a fluid to flow in or out of the piston via the chamber, and in that, the piston is slidably reciprocatively contained and retained within a housing member having an interior wall surface about a housing chamber for slidably contacting the piston second wall and having a seat member which extends transversely with respect to the housing interior wall surface for seating the piston seat open end and which is positioned so that when the piston is seated, the at least one aperture is confined by the housing to close the valve to fluid flow and so that when the piston is at a position displaced away from the housing seat means, the at least one aperture is unconfined by the housing so that the valve is open to flow of fluid.

More particularly, the present invention is characterized in that the valve has:
  a piston member having a piston closed end comprising a first piston wall, having a second piston wall which extends transversely from the first wall to define, together with the first wall, a piston chamber and which has at least one aperture therethrough for a fluid to flow out of the piston via the chamber, and having a piston seat end which is displaced from the closed end by the second wall therebetween and which opens into the chamber for a fluid to flow into the chamber;
  a housing member having an interior wall surface which extends from an open housing end and defines an open-ended chamber configured for slidably contacting the piston second wall and having an apertured piston seat member which is displaced from the open housing end and extends transversely with respect to the interior wall surface and which is configured and positioned for seating the piston seat open end and for allowing fluid flow therethrough to the piston chamber;
  means integrated with the piston for reciprocatively retaining the piston within the housing for urging the piston seat end to the housing seat member to close the valve to flow of fluid and so that when the piston is at a position displaced away from the seat member so that the valve is open to fluid flow, for preventing the piston from disengaging from the housing; and wherein the housing interior wall surface and the seat member and the at least one piston second wall aperture are configured and positioned so that when the piston seat end is seated against the seat member, the at least one piston second wall aperture is confined by the housing interior wall surface to close the valve to fluid flow and so that when the piston seat end is at a position displaced away from the seat member, the at least one piston second wall aperture is unconfined by the housing interior wall surface so that the valve is open to flow of fluid.

Further, in the present invention, the means for reciprocatively retaining the piston comprise a rod which is positioned to extend into the piston seat open end and into the piston chamber in a direction parallel to a longitudinal axis of the piston second wall at a position substantially centrally disposed within the piston chamber, means for affixing the rod to the piston, and means for tensioning the rod to urge the piston the housing seat member to be seated, and the housing seat member further is configured for slidably containing the rod.

DESCRIPTION OF PREFERRED EMBODIMENTS

In accordance with the present invention, the valve device, preferably, also is characterized further in that it has a seal means positioned at a position between the housing and the piston and wherein the at least one piston second wall aperture and the seal means are positioned so that when the piston is seated, the seal means seals an interface between the piston and the housing interior wall surface to flow of fluid. In particular, the at least one piston second wall aperture and the seal means are positioned so that when the piston is seated, the seal means is positioned between the at least one piston second wall aperture and the housing open end so that the seal means seals the piston/housing interior wall surface interface.

The means integrated with the piston for reciprocatively retaining the piston for seating and for preventing the piston from disengaging from the housing include a rod and means for affixing the rod to the piston so that the rod and piston move integrally. Affixation means may include such as, in a case where the rod extends through the chamber to the first wall, a weld between the rod and the piston first wall within the chamber, or the affixing means may include supporting struts integral with the piston second wall which extend into the chamber and which are secured directly to the rod or to a member which surrounds the rod which is thereby secured to the rod, such as by welding or other securing means.

Most advantageously, however, the piston first wall contains a centrally disposed aperture therethrough having a size sufficient for containing a cross-sectional surface of the rod and through which the rod extends. The rod thus extends to and through the piston seat open end and the chamber and to and through the first wall aperture. In this embodiment, the means for affixing the rod and the piston include means for securing the rod and the first piston wall, so the piston and rod move integrally, and including means for sealing the interface of the rod and wall at the aperture to seal the interface, which two functions may be fulfilled by welding, for example, or with a threaded nut arrangement and seals or welding.

The means integrated with the piston for reciprocatively retaining the piston for seating and for preventing the piston from disengaging from the housing also include means for tensioning the rod. The tensioning means may be integrated with the housing, or other support means. However, the tensioning means is arranged and positioned most advantageously so that the seat member is positioned between the piston and the tensioning means so that a force for tensioning the rod may be applied to the seat member and redound to apply force to the rod to tension the rod and urge the piston into the seat. Thus, as will be appreciated, the seat, in such case, should have a surface configured for carrying out such function, while providing sufficient open area for free flow of fluid to the piston, and preferably, the seat surface should have sufficient open area to avoid pressure differentials of significance on either side of the seat. In such case, the seat also should have a strength sufficient to withstand the forces applied for tensioning and for withstanding forces applied by the tensioning means or other means which prevents the piston from disengaging from the housing when the valve is open to fluid flow.

Further included in the present invention are assemblies which advantageously include the valve device characterized in that the valve device is positioned in a first conduit integrated with a second conduit for introducing a fluid into the second conduit, such assemblies being useful in a two-fluid system and particularly when the second conduit carries a flow of a viscous, or tacky, fluid under pressure. In particular, it has been discovered that the valve device of the present invention may be employed advantageously for introducing a fluid into an extrusion apparatus system, particularly for cleaning the system. More particularly, it has been discovered that the valve device may be incorporated advantageously in a device which partitions an extrudate flow from an extruder into a plurality of separate streams and may be employed particularly advantageously an extrusion system arranged and operated as described below in conjunction with drawing FIG. 4 and as also disclosed in the patent application of Boatman, Farnsworth, Johnson and Young, entitled MIXING OF FLUID SUBSTANCES, U.S. patent application Ser. No. 08/188437, filed concurrently herewith, the disclosure thereof being incorporated herein by reference as if fully set forth herein.

BRIEF DESCRIPTION OF THE DRAWING FIGURES

DETAILED DESCRIPTION OF THE DRAWINGS

Figure 1:
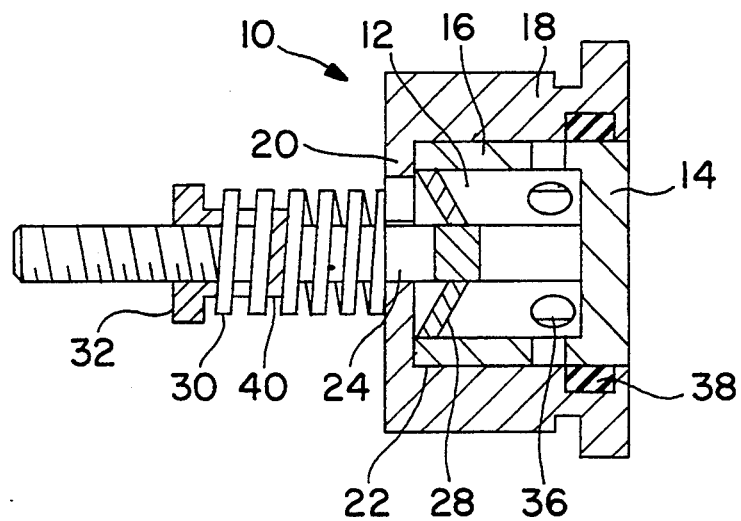
FIG. 1 is a side elevation view of a valve device according to the present invention.

A valve device according to the present invention is designated generally in FIG. 1 by reference numeral 10. Piston 12 has a first closed end comprised of wall 14 and has a second wall 16 which extends transversely from wall 14 and to a piston seat open end which thereby is displaced from wall 14 by wall 16 and which opens into a chamber defined by walls 14 and 16. Housing 18 has an open end which is adjacent wall 14 and as illustrated, the outer surface of wall 14 does not extend beyond the end of the housing wall interior surface and thus, the junction of the outer surfaces of piston walls 12 and 14 does not extend beyond the housing wall interior surface when piston 12 is seated. The housing also includes apertured housing seat 20 displaced from the open housing end. Piston 12, therefore, is shown in a seated, closed position in housing 18, i.e., the piston open end is in a contacting relation with housing seat 20.

The outer surface of piston 12 and the housing interior surface, identified by the drawing interface line designated by reference numeral 22, are configured to be in slidable contact. Practically, piston wall 16 is configured to have annular interior and exterior surfaces and thus, the housing interior wall surface along interface line 22 would likewise be annular. As will be appreciated, the exterior surface of housing 18 may be threaded for enabling integration of the valve in such as a threaded conduit.

Figure 2:
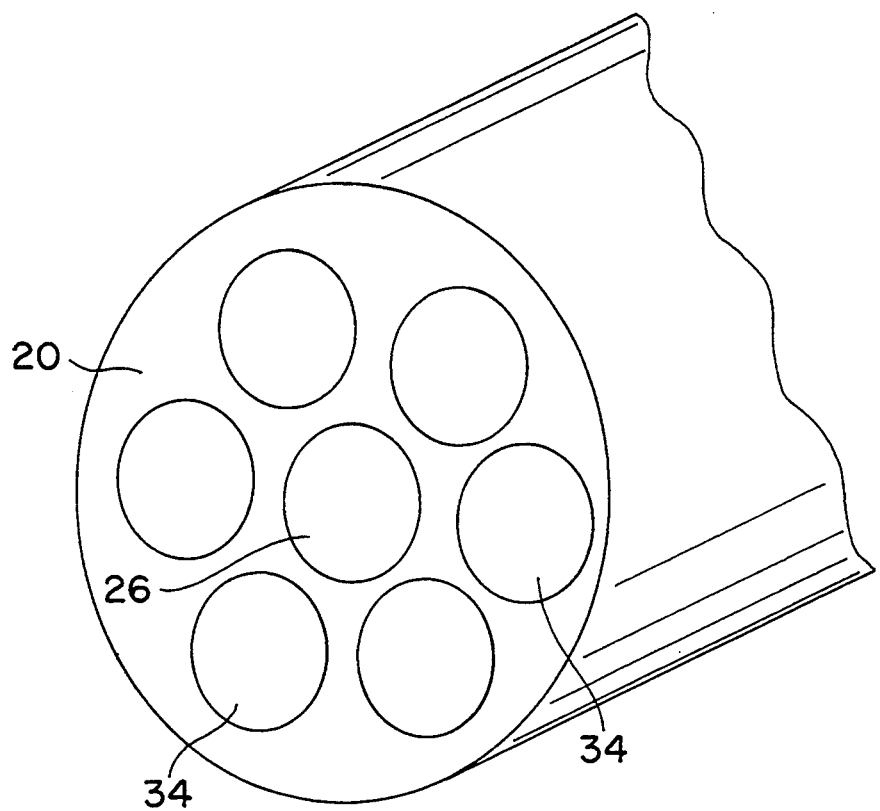
FIG. 2 illustrates a view of a seat means of the housing of a valve device according to the present invention.

As illustrated in FIG. 1, the reciprocative means are exemplified by piston rod 24 which extends through a substantially centrally disposed aperture in seat 20, such being depicted more particularly in FIG. 2 wherein the aperture of seat 20 for containing the rod is designated by reference numeral 26. Means for affixing rod 24 with piston 12 is illustrated as being provided by a plurality of struts 28 which are integral with wall 16 and extend into the piston chamber. Rod 24 may be secured directly to the struts, or to a ring connecting the struts, as illustrated, such as by welding or other equivalent securing means, including a threaded arrangement should the rod not extend all the way to wall 14, for example.

Means for tensioning is illustrated by a spring 30 which is positioned about rod 24 and held in position against seat 20 by affixation means illustrated as a threaded nut 32 screwed onto threads formed in the rod. As will be appreciated, the tension may be adjusted by turning nut 32. Although the tensioning means is illustrated as a spring configuration, the present invention is not limited to such, since other equivalent tensioning means such as, for example, hydraulic or pneumatic cylinders, may be employed. In addition, as will be appreciated, nut 32 may also function, together with the spring, of course, by reason of its positioning, for preventing disengagement of piston 12 from housing 18 when the valve is open to flow.

As indicated above, and with further reference to FIG. 2, in addition to providing for containing and aligning the rod, seat 20 also provides for allowing a fluid to flow therethrough for introduction of the fluid into the piston chamber, and therefore, seat 20 contains at least one aperture 34 in addition to aperture 26, the latter providing for slidably containing rod 24. Preferably, as illustrated in FIG. 2, seat 20 contains a plurality of apertures 34, such as from 4 to 8 apertures, each having, preferably, a size sufficient so that, in operation, pressure differentials on either side of seat 20 substantially are minimized. As also will be appreciated, with regard to the embodiment illustrated, apertures 34 of seat 20 should be configured and positioned with a view to the seat having sufficient solid surface area so that support for the spring of the tensioning means, or for other tensioning means is provided. As also will be appreciated, the seat and apertures may be configured in a strut-like assembly having a solid central portion about the rod for contacting the spring.

Figure 4:
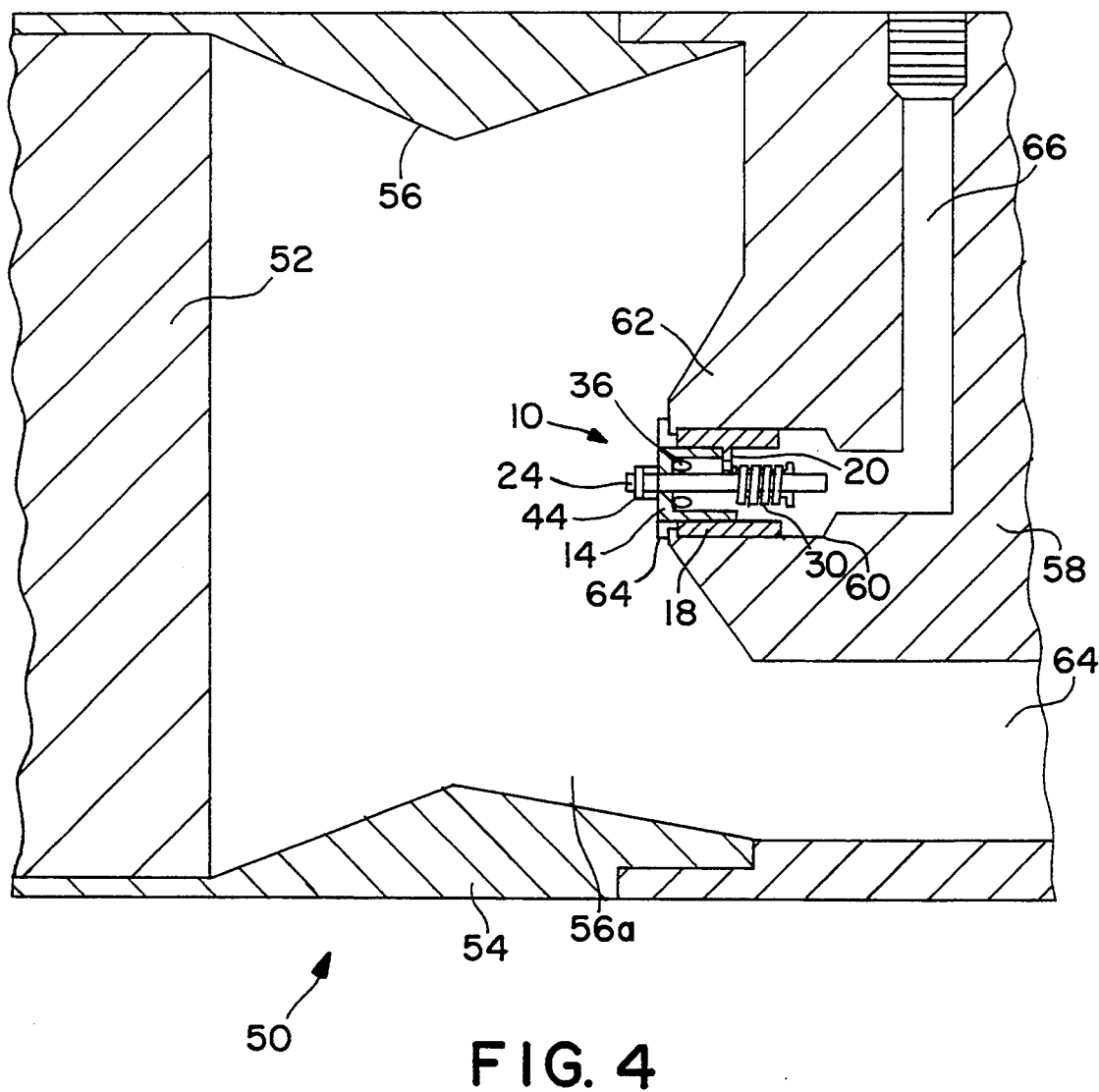
FIG. 4 is a side elevation view of an extrusion partitioning device assembly which includes a valve device according to the present invention integrated therein.

Again, with reference to FIG. 1, wall 16 of piston 12 also contains at least one and, depending upon the environment of use, a plurality of apertures 36 therethrough at a position such that upon the piston being seated, as illustrated, the aperture(s) is closed off to flow by the interior wall surface of housing 18. When a plurality of piston aperture passages 36, such as from 4 to 8 apertures, is employed in an assembly such as illustrated by FIG. 4 and discussed further below, it is preferred to space the apertures equidistantly about wall 16.

Seal means 38, which may be provided by such as an 0-ring, is positioned between the housing and piston to ensure further that when piston 12 is positioned in a seated position so that the valve is closed to fluid flow, as illustrated, the interface between the piston and the housing wall surface is sealed to flow of fluid. Hence, piston aperture(s) 36 and seal means 38 are positioned between the housing and the piston at a position so that when the piston is in a seated, closed position, seal means 38 is positioned at a position between the open end of the housing and piston aperture(s) 36 so that the seal seals the interface between the piston and the housing interior wall surface. In addition, although the seal is shown as being integrated with the housing, such also may be integrated readily with the piston. Suitable seal materials include viton, buna and other rubbery substances, and mechanical, i.e., metallic, seals also may be employed.

As will be appreciated, the illustrated means of tensioning may be adjusted to a tension which is sufficient to urge piston 12 to a closed position, the amount of force required being dependent such as upon an amount of pressure applied by a fluid to piston 12. As also will be appreciated, the tension and resistance to opening may be adjusted to counteract fluid pressure on the piston to control the distance the piston extends out of the housing upon opening for fluid delivery such also may be regulated by a stop member 40 positioned on rod 24, the stop being positioned at a position which allows piston apertures 36 to exit the housing to dispense flow and prevents disengagement of the piston from the housing.

Figure 3:
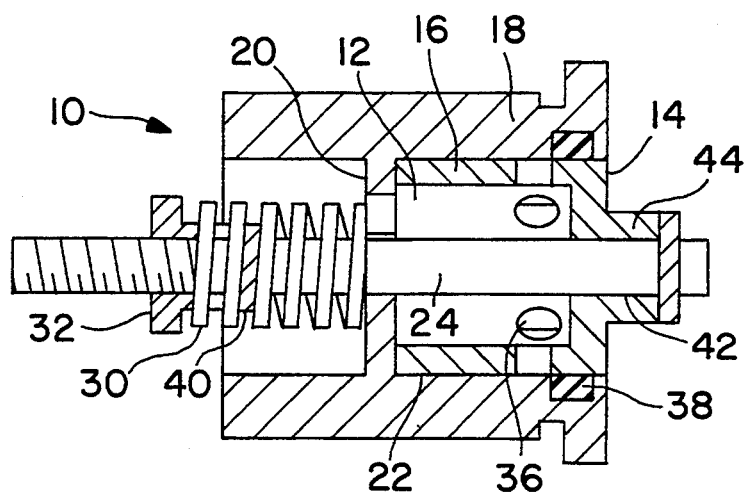
FIG. 3 is a side elevation view of a further embodiment of a valve device according to the present invention.

The embodiment of the device of FIG. 3 is advantageous for ease of manufacture and for withstanding substantial pressures on the order of up to 200 bar and in excess thereof, particularly, by reason of the manner of the arrangement and affixation of rod 24 and piston 12. The device of FIG. 3 contains the elements of the device of FIG. 1, but for rod affixation piston struts 28 and the associated strut connecting ring. In this embodiment, in addition to the housing extending to a position beyond seat 20, the seat thus, being intermediately disposed in the housing, piston first wall 14 contains a centrally disposed aperture defined by drawing interface line 42 for containing rod 24 which extends therethrough.

Further with regard to the embodiment of FIG. 3, although rod 24 could be affixed to and sealed adjacent the outer face of piston first wall 14, as illustrated, piston 12 is further configured to provide a sleeve 44 which extends transversely from the outer face first wall 14 and in which rod 24 is seated further. Although rod 24 could be threaded and secured to the piston with a bolt and seal means, most advantageously, the rod is secured by a weld 46 to sleeve 44. This embodiment enables convenient tightening of the threaded tensioning means since sleeve 44 and/or rod 24 may be configured so that such may be held conveniently in such as a vise during tension tightening.

FIG. 4 illustrates an apparatus, generally designated by reference numeral 50, for extrusion of materials and in which the valve device of the invention may be incorporated advantageously for cleaning the assembly thereby providing a two-conduit two-fluid assembly system. The assembly includes means for partitioning a fluid flow into a plurality of separate flow streams, and as illustrated, includes an extruder having barrel 52 which delivers extrudate to an adapter device 54, such as a plate, which is integrated with the discharge end of extruder barrel 52 by, as illustrated, a sleeving arrangement. The adapter device has a beveled interior surface 56 forming a beveled conduit 56a for converging a flow of extrudate from the extruder to impart an extrudate flow vector which is substantially uniform and linear. That is, the adapter is constructed to converge the flow so that tendencies of lateral flow, due to such as the effects of screw rotation, are muted and minimized to provide an extrudate flow vector which is substantially linear.

Adapter 54 is integrated in a sleeved arrangement with the above-mentioned partitioning means, which is illustrated as being formed by plate 58 which has a centrally disposed portion which provides a conduit 60 which contains valve device 10 in plate protruding portion 62. Screw threads on each of the outer surface of valve housing 18 and the plate surface which defines the portion of conduit 60 for containing the valve provide for securing the valve and plate. Plate protruding portion 62 provides for guiding a fluid flow, here an extrudate flow, to a plurality of apertures 64 thereby effecting partitioning of a single extrudate flow stream from adapter 54 into a plurality of flow streams which pass through plate 58 face to face. Wall 14 of the piston thus forms an apex of protruding portion 62, and the piston, and hence, wall 14, is displaceable from protruding portion 62 into the space of conduit 56a upon operation of the piston to open it to fluid flow.

Advantageously, housing 18 has a portion 64 which extends transversely to cover the screw thread interface between the plate and housing. Although not so illustrated, piston sleeve 44 and the outer face surface of wall 14, which faces the extruder and adapter, and the end of rod 24 and also housing portion 64 may be configured to conform with a shape of protruding portion 62, such as having a shape of a cone, if desired. A bore 66 formed in plate 58 provides a conduit to supply fluid to valve 10 for introduction into conduit 56a of adapter 54.

In operation of the valve device of the invention, and with further reference to FIG. 4, as long as the pressure of the fluid supplied by bore passage 66 is less than the pressure exerted against the face of piston wall 14 which faces the extruder and the adapter, the valve will remain closed to flow of fluid. Likewise, the tensioning means, including spring 30, may be employed to maintain valve closure, and when it is desired to introduce fluid from valve 10 into conduit 56a, fluid in passage 66, and hence, conduit 60, is placed under a pressure in excess of that applied against the face of piston wall 14 which faces conduit 56a, if any, and sufficient to overcome any resistance of the tensioning means. Thus, the piston is displaced from seat 20 slidably in housing 18 to expose piston apertures 36 so that a fluid is delivered from the piston chamber into conduit 56a.

As is clear from the foregoing, various modifications of the present invention may be made without departure from the spirit and scope of the disclosure, and the invention may be embodied suitably in the absence of elements or members not specifically disclosed here.

We claim:

1. A valve comprising:

a piston member having a closed end comprising a first wall, having a second wall which extends transversely from the first wall to define, together with the first wall, a piston chamber and which has at least one aperture therethrough for a fluid to flow out of the piston member from the chamber, and having a piston seat end which is displaced from the closed end by the second wall therebetween and which opens into the chamber for a fluid to flow into the chamber;

a housing member having an interior wall surface which extends from an open housing end and defines an open-ended chamber configured for slidably contacting the piston second wall and having an apertured seat member which is displaced from the open housing end and extends transversely with respect to the interior wall surface and which is configured and positioned for seating the piston seat end and for allowing fluid flow therethrough to the piston chamber;

means integrated with the piston member for reciprocatively retaining the piston member within the housing comprising a portion of the seat member which defines an aperture at a position about a substantially centrally disposed longitudinal axis of the piston second wall, a rod which extends slidably through the substantially centrally disposed seat member aperture into the piston chamber in a direction parallel to the longitudinal axis, means for affixing the rod to the piston member and means for tensioning the rod for urging the piston member for seating the piston seat end against the seat member and so that when the piston seat end is at a position displaced away from the seat member, the piston member is prevented from disengaging from the housing; and wherein the housing interior wall surface, the seat member, the at least one piston second wall aperture and the means for reciprocatively retaining the piston member are configured and positioned so that when the piston seat end is seated against the seat member, the at least one piston second wall aperture is confined by the housing interior wall surface to close the valve to fluid flow and so that when the piston seat end is at a position displaced away from the seat member, the at least one piston second wall aperture is unconfined by the housing interior wall surface so that the valve is open to flow of fluid.

2. A valve according to claim 1 further comprising a seal means integrated with the housing and wherein the at least one piston second wall aperture and the seal means are positioned so that when the piston seat end is seated, the seal means is positioned in the housing between the at least one piston second wall aperture and the housing open end so that the seal means seals an interface between the piston second wall and the housing interior wall surface to flow of fluid.

3. A valve comprising:

a piston member having a closed end comprising a first wall, having a second wall which extends transversely from the first wall to define, together with the first wall, a piston chamber and which has at least one aperture therethrough for a fluid to flow out of the piston member from the chamber, and having a piston seat end which is displaced from the closed end by the second wall therebetween and which opens into the chamber for a fluid to flow into the chamber;

a housing member having an interior wall surface which extends from an open housing end and defines an open-ended chamber configured for slidably contacting the piston second wall and having an apertured piston seat member which is displaced from the open housing end and extends transversely with respect to the interior wall surface and which is configured and positioned for seating the piston seat end and for allowing fluid flow therethrough to the piston chamber;

means integrated with the piston member for reciprocatively retaining the piston member within the housing comprising a portion of the seat member which defines an aperture at a position about a substantially centrally disposed longitudinal axis of the piston second wall, a rod which extends slidably through the substantially centrally disposed seat member aperture into the piston chamber in a direction parallel to the longitudinal axis, means for affixing the rod to the piston member and means for tensioning the rod for urging the piston member for seating the piston seat end against the seat member and so that when the piston seat end is at a position displaced away from the seat member, the piston member is prevented from disengaging from the housing;

a seal means integrated with the housing at a position for sealing an interface between the piston second wall and the housing interior wall surface to flow of fluid; and wherein the housing interior wall surface, the seal means, the seat member, the at least one piston second wall aperture and the means for reciprocatively retaining the piston member are configured and positioned so that when the piston seat end is seated against the seat member, the at least one piston second wall aperture is confined by the housing interior wall surface to close the valve to fluid flow and the seal means is positioned between the at least one piston second wall aperture and the housing open end for sealing the interface and so that when the piston seat end is at a position displaced away from the seat member, the at least one piston second wall aperture is unconfined by the housing interior wall surface so that the valve is open to flow of fluid.

4. A valve according to claim 1 or 3 wherein the means for affixing the rod to the piston member comprise struts integral with the piston second wall which extend into the chamber and which are secured to the rod.

5. A valve according to claim 1 or 3 wherein the piston first wall has a centrally disposed aperture therethrough having a size sufficient for containing a cross-sectional surface of the rod and wherein the rod extends through the chamber and through the first wall aperture and wherein the means for affixing the rod and piston member comprise means for securing the rod with the first wall and for sealing an interface of the rod and first wall at the first wall aperture.

6. A valve according to claim 1 or 3 wherein the piston first wall has a centrally disposed aperture therethrough having a size sufficient for containing the cross-sectional surface of the rod and further comprising a sleeve which extends transversely from the first wall about the first wall aperture and which has a size sufficient for containing the cross-sectional surface of the rod and wherein the rod extends through the sleeve and wherein the means for affixing the rod to the piston member comprise means for securing the rod and the sleeve and for sealing an interface of the rod and sleeve.

7. A valve according to claim 1 or 3 wherein the tensioning means comprises a spring positioned about the rod adjacent the seat member.

8. A valve according to claim 1 or 2 or 3 wherein the piston first and second walls have outer surfaces configured so that when the piston seat end is seated, a junction of the outer surfaces of the first and second walls does not extend beyond the housing wall interior surface.

9. A two-conduit two-fluid assembly comprising:
means for separating a fluid flow into a plurality of separate flow streams having a centrally disposed protruding portion, a conduit which has an opening centrally disposed in the protruding portion and having a plurality of apertured passages positioned about the protruding portion for a fluid substance to flow therethrough; and a valve positioned in the centrally disposed opening in the protruding portion comprising:

a piston member having a closed end comprising a first wall, having a second wall which extends transversely from the first wall to define, together with the first wall, a piston chamber and which has at least one aperture therethrough for a fluid to flow in or out of the piston member from the chamber, and having a piston seat end which is displaced from the closed end by the second wall therebetween and which opens into the chamber for a fluid to flow into the chamber;

a housing member having an interior wall surface which extends from an open housing end and defines an open-ended chamber configured for slidably contacting the piston second wall and having an apertured seat member which is displaced from the open housing end and extends transversely with respect to the interior wall surface and which is configured and positioned for seating the piston seat end and for allowing fluid flow therethrough to the piston chamber;

means integrated with the piston member for reciprocatively retaining the piston member within the housing comprising a portion of the seat member which defines an aperture at a position about a substantially centrally disposed longitudinal axis of the piston second wall, a rod which extends slidably through the substantially centrally disposed seat member aperture into the piston chamber in a direction parallel to the longitudinal axis, means for affixing the rod to the piston member and means for tensioning the rod for urging the piston member for seating the piston seat end against the seat member and so that when the piston seat end is at a position displaced away from the seat member, the piston member is prevented from disengaging from the housing; and wherein the housing interior wall surface, the seat member, the at least one second piston wall aperture and the means for reciprocatively retaining the piston member are configured and positioned so that when the piston seat end is seated against the seat member, the at least one piston second wall aperture is confined by the housing interior wall surface to close the valve to fluid flow and so that when the piston seat end is at a position displaced away from the seat member, the at least one piston second wall aperture is unconfined by the housing interior wall surface so that the valve is open to flow of fluid.

10. An assembly according to claim 9 further comprising a seal means integrated with the housing and wherein the at least one piston second wall aperture and the seal means are positioned so that when the piston seat end is seated, the seal means is positioned in the housing between the at least one piston second wall aperture and the housing open end so that the seal means seals an interface between the piston second wall and the housing interior wall surface to flow of fluid.

11. A two-conduit two-fluid assembly comprising:
means for separating a fluid flow into a plurality of separate flow streams having a centrally disposed protruding portion, a conduit which has an opening centrally disposed in the protruding portion and having a plurality of apertured passages positioned about the protruding portion for a fluid substance to flow therethrough; and
a valve positioned in the centrally disposed opening in the protruding portion comprising:
  a piston member having a closed end comprising a first wall, having a second wall which extends transversely from the first wall to define, together with the first wall, a piston chamber and which has at least one aperture therethrough for a fluid to flow in or out of the piston member from the chamber, and having a piston seat end which is displaced from the closed end by the second wall therebetween and which opens into the chamber for a fluid to flow into the chamber;
  a housing member having an interior wall surface which extends from an open housing end and defines an open-ended chamber configured for slidably contacting the piston second wall and having an apertured seat member which is displaced from the open housing end and extends transversely with respect to the interior wall surface and which is configured and positioned for seating the piston seat end and for allowing fluid flow therethrough to the piston chamber;
  means integrated with the piston member for reciprocatively retaining the piston member within the housing for urging the piston member for seating the piston seat end against the seat member and so that when the piston seat end is at a position displaced away from the seat member, the piston member is prevented from disengaging from the housing;
  a seal means integrated with the housing at a position for sealing an interface between the piston second wall and the housing interior wall surface to flow of fluid; and
wherein the housing interior wall surface, the seal means, the seat member, the at least one second piston wall aperture and the means for reciprocatively retaining the piston member are configured and positioned so that when the piston seat end is seated against the seat member, the at least one piston second wall aperture is confined by the housing interior wall surface to close the valve to fluid flow and the seal means is positioned between the at least one piston second wall aperture and the housing open end for sealing the interface and so that when the piston seat end is at a position displaced away from the seat member, the at least one piston second wall aperture is unconfined by the housing interior wall surface so that the valve is open to flow of fluid.

12. An assembly according to claim 11 wherein the means for reciprocatively retaining the piston comprise a portion of the seat member which defines an aperture at a position about a substantially centrally disposed longitudinal axis of the piston second wall, a rod which extends slidably through the substantially centrally disposed seat member aperture into the piston chamber in a direction parallel to the longitudinal axis, means for affixing the rod to the piston member and means for tensioning the rod for urging the piston member for seating the piston seat end against the seat member and to prevent the piston member from disengaging from the housing.

* * * * *